June 28, 1966  A. W. STANLEY  3,258,588
VEHICLE SIGNAL LAMP
Filed Feb. 3, 1964
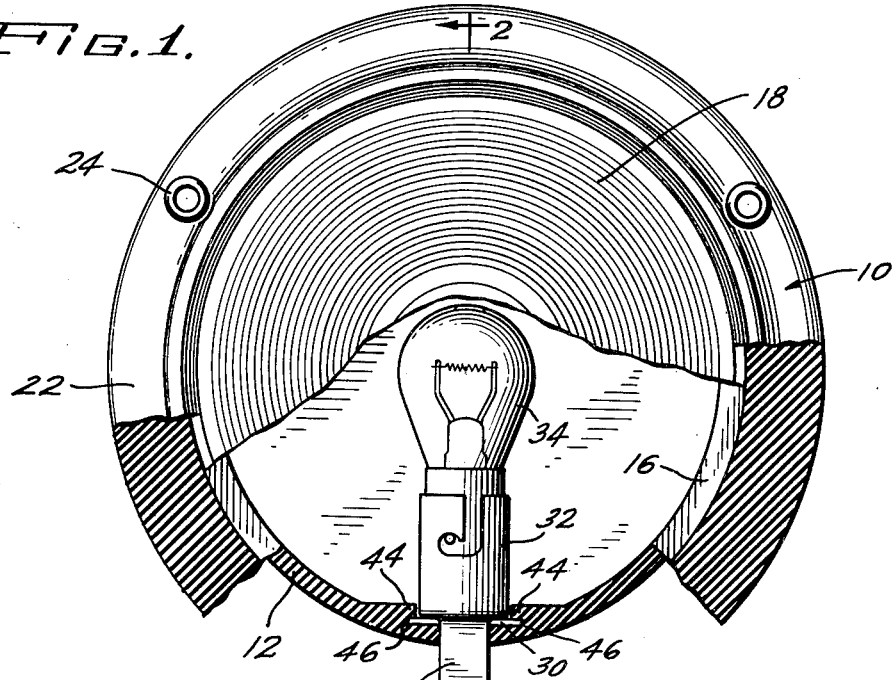
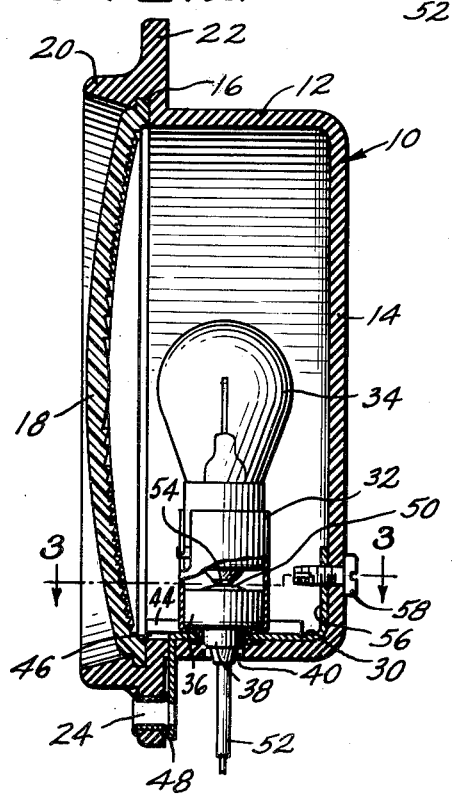
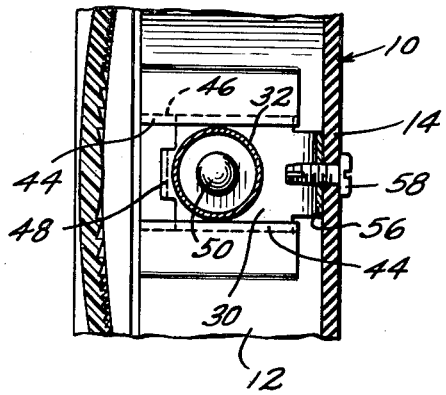
INVENTOR.
Alfred Stanley
BY
Bair, Freeman & Molinare Attys.

United States Patent Office 3,258,588
Patented June 28, 1966

3,258,588
VEHICLE SIGNAL LAMP
Alfred W. Stanley, Cicero, Ill., assignor to King Bee Manufacturing Co., Bellwood, Ill., a corporation of Illinois
Filed Feb. 3, 1964, Ser. No. 341,995
1 Claim. (Cl. 240—8.3)

This invention relates to vehicle signal lamps for use as stop, tail and directional lights on trucks, tractors, trailers, buses and the like.

More particularly, the invention is directed to lamps of the type utilizing a housing formed of rubber-like material adapted to be mounted in metal buck plates or panels of the vehicle. Desirably, such lamps are constructed and arranged so as to simplify electrical wiring, and hence one electrical socket connection for the light bulb of each of such lamp is made by grounding through the body or chassis of the vehicle. One of the main advantages of lamps of this general class is that they are substantially sealed so as to exclude dust, dirt and moisture from entering the interior of the housing, and by virtue of which there is eliminated many objectionable conditions as existed in connection with signal lamps utilizing metal housings.

Signal lamps of this general type, as heretofore produced, embodying a housing of rubber-like material, such as disclosed in United States Letters Patent No. 3,100,085, pose several problems. The light bulbs for such lamps are usually grounded to the vehicle body or chassis by means of one of the mounting screws utilized for securing the lamp in position on the vehicle and the screw is caused to be engaged in an aperture of a lug on a bracket sub-assembly, carrying the light bulb socket and light bulb. When the screw is turned incident to securing the lamp in fixed position, torque is transmitted through the ground lug and bracket, and socket, causing the sub-assembly of said parts to be turned laterally, with the result that the light bulb usually is caused to assume a position out of center and focus with the lens of the lamp. This condition results in photometric deficiencies and failures which greatly impair and reduce the effectiveness of the signals given by the lamp. Such mal-adjustment of the bracket together with the socket and light bulb frequently causes the sealing plug of the "pig tail" electrical connector wire assembly to be pulled out of sealing relation to an opening in the housing, thus permitting dust, dirt and moisture to enter the housing and which causes corrosion and impairment of the electrical connections for the light bulb.

One of the objects of this invention is to provide an improved vehicle signal lamp of the character indicated having a resilient cradle mounting for the sub-assembly comprising a bracket, together with the socket and light bulb, by virtue of which the sub-assembly yieldingly maintained in proper position, with the light bulb centered and in focus with the lens of the lamp, and thereby reducing photometric deficiencies and failures to a practical minimum.

Another object is to provide an improved vehicle signal lamp of the character indicated having a novel form of mounting means for the assembly comprising the bracket, socket, light bulb and "pig tail" assembly and which yieldingly maintains the assembly of parts in proper centered position, and substantially eliminates the possibility of the sealing plug of the "pig tail" assembly from being pulled out of sealing relation to an opening in the housing, in which it is normally frictionally fitted, and thus insuring against entry of dust, dirt and moisture into the lamp housing, and thus eliminating the disadvantages attendant upon such a condition.

Other objects and advantages of this invention will be apparent from the following description, taken in connection with the accompanying drawing in which:

FIGURE 1 is a front elevational view, with the parts broken away and end section, of the signal lamp embodying the present invention.

FIGURE 2 is a vertical sectional view through the lamp, taken substantially as indicated at line 2—2 on FIGURE 1.

FIGURE 3 is a fragmentary sectional view, taken as indicated on line 3—3 at FIGURE 2.

The improved signal lamp as shown in the drawing comprises a housing 10, molded of rubber-like material, such as rubber, synthetics resins, or other suitable materials having similar characteristics. The housing is of general cup shape form, including a continuous side wall 12 of substantially circular contour, and an integral back or end wall 14. The opposite end of the housing is open and is formed with an internal annular groove 16 for snugly receiving the marginal portion of a lens 18. Extending forwardly from the open end of the housing is an annular bead 20, the extreme forward surface of which extends forwardly beyond the lens 18, as seen in FIGURE 2. The annular bead is formed as an integral part of the housing and serves as a bumper to protect the lens of the lamp upon contact with other objects. Also formed integrally with the housing, adjacent the open end, is radially and outwardly extending mounting means 22, herein shown in the nature of a flange. The flange is provided with three circumferentially spaced apart apertures in which there is fixedly mounted metal eyelets or grommets 24.

It is by virtue of the three grommeted openings in the flange 22 that the lamp is caused to be firmly secured in the buck plate or panel of the vehicle by means of suitable screws or bolts, not shown. The screw or bolt which is to be extended through the grommeted opening in the lower or bottom portion of the flange 22, into operative connection with the chassis or body of the vehicle, will serve to provide a ground connection for the light bulb of the assembly within the housing.

Disposed within the housing 10 is a metal bracket 30, such as brass, to which is fixedly attached a tubular, upwardly extending lamp socket 32. Detachably mounted in the lamp socket is a single filament type of light bulb 34. Operatively associated with the light socket is an electrical "pig tail" assembly of conventional form, including a resilient rubber-like head 36, snugly fitted in the bottom portion of the socket. Extending downwardly from the head 36 is a plug portion 38, dimensioned for a snug frictional fit in an aperture 40, formed in the bottom portion of the cylindrical side wall 12, of the housing, as seen in FIGURE 2. The purpose of the plug is to seal the housing so as to preclude entry of dirt, dust and moisture into the interior of the housing.

The bracket, socket and light bulb assembly are supported upon and connected to resilient cradle mounting means which is formed as an integral part of the rubber-like housing 12, as clearly seen in the drawings. The cradle means comprises a pair of spaced apart resilient lips 44, each defined by under cut grooves 46, in which there is seated and snugly embraced a pair of opposite marginal edge portions of the mounting bracket 30. The resilient lips extend from the forward edge portion of the cylindrical body rearwardly and terminate adjacent the back end wall 14.

By virtue of the cradle mounting means the resilient lips 44, serve to resiliently secure assembly comprising the mounting bracket together with its socket and light bulb in a proper position, with the filament of the light bulb centered in focus with the lens 18, thereby insuring proper photometric relation between the light bulb and the lens.

The forward portion of the bracket 36 terminates in a depending, apertured lug 48 which is caused to be extended through a slit formed in the bottom portion of the side wall 12, so that the aperture of said lug is disposed in registration with the opening in the metal grommet 24, as seen in FIGURE 2, and by virtue of which when a mounting screw or bolt is inserted through the grommet and the aperture in the lug, in process of attachment of the lamp to the buck plate or panel of the vehicle, a suitable grounding connection is provided from the bracket to the socket and light bulb to the vehicle chassis or body.

By virtue of the resilient cradle mounting means it will be apparent that in the process of mounting or securing the lamp in place on a vehicle, turning of the bottom mounting screw or bolt will not cause rocking or turning of the mounting bracket, together with the socket and light bulb and said subassembly will tend at all times to be yieldingly maintained in proper centered position. When it may be necessary to replace a light bulb 34 in the lamp any pressures or forces applied incident thereto will be opposed by the lips 44, and thus insure maintaining the assembly in proper centered position with the light bulb centered in focus with the lens. Further, by virtue of this construction there is no likelihood, due to either of the two above mentioned conditions, for the sealing plug 38 of the "pig tail" assemly to be pulled out of its cooperating opening 40, in the bottom of the side wall of the housing, and thus serves to insure that the interior of the lamp is at all times relatively sealed to exclude dust, dirt and moisture.

As shown, the "pig tail" assembly includes a single contact button 50, connected to a single conductor wire 52, with the contact button positioned on top of the "pig tail" head 36 for engagement with the single center contact 54 on the bottom of the light bulb 34. Such an arrangement utilizing a single filament lamp is for a single type of signal, such as either a stop signal, or a tail light signal or a directional signal. If desired, a multi filament lamp may be substituted, utilizing a "pig tail" assembly having a multiple number of contact buttons for cooperating engagement with the corresponding contacts provided on the bottom of the light bulb and separate conductor wires are connected to each contact button.

To further insure maintaining the sub-assembly comprising the bracket, socket and light bulb, in proper position with respect to the resilient cradle mounting means, the rear end of the mounting bracket terminates in an upstanding leg 56, and which is secured to the back wall 14 of the housing by a screw 58.

Although I have herein shown and described a preferred embodiment of the invention, manifestly it is capable of modification and rearrangement without departing from the spirit and scope thereof. I do not, therefore, wish to limit the invention to the precise embodiment herein disclosed, except as I may be so limited by the appended claim.

I claim:

A vehicle signal lamp comprising a rubber-like cup-shaped housing having a continuous side wall and an integral back end wall and the opposite end being open, a lens closing the open end of the housing, resilient cradle mounting means on the inner surface of said side wall and extending generally in the direction of the axis of the lens, said cradle means being formed integrally with the housing and comprising a pair of spaced apart resilient lips, said lips extending toward each other with the upper surfaces thereof being in the same plane, a channel undercutting each of said lips, with the lower surfaces of said channels being continuous with each other and lying in the same plane, a bracket supported on said cradle means and having a lower flat portion lying against the continuous lower planar surfaces of said channels with opposite edge portions of said bracket extending into said channels, a radially extending socket secured to the bracket and a light bulb mounted in the socket, said lips being spaced apart a distance approximating the size of said socket to yieldingly maintain said socket in a position with the light bulb centered in focus with the lens.

References Cited by the Examiner

UNITED STATES PATENTS

| | | |
|---|---|---|
| 2,296,151 | 9/1942 | Dover. |
| 2,686,868 | 8/1954 | Diedring _____ 240—8.3 X |
| 3,059,104 | 10/1962 | Dickson _____ 240—8.3 |
| 3,100,085 | 8/1963 | Dover _____ 240—8.3 |
| 3,127,117 | 3/1964 | Mappes _____ 240—90 X |
| 3,145,933 | 8/1964 | Dickson _____ 240—8.3 X |

NORTON ANSHER, *Primary Examiner.*